(12) United States Patent
Sinclair et al.

(10) Patent No.: US 7,683,310 B1
(45) Date of Patent: Mar. 23, 2010

(54) LASER WARNING RECEIVER TO IDENTIFY THE WAVELENGTH AND ANGLE OF ARRIVAL OF INCIDENT LASER LIGHT

(75) Inventors: Michael B. Sinclair, Albuquerque, NM (US); William C. Sweatt, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 44 days.

(21) Appl. No.: 12/108,635

(22) Filed: Apr. 24, 2008

(51) Int. Cl.
*H01J 3/14* (2006.01)
*H01J 5/16* (2006.01)

(52) U.S. Cl. ............... 250/216; 250/203.1; 250/214 R

(58) Field of Classification Search ............. 250/221, 250/203.6, 203.1, 203.3, 203.4, 214 R, 216; 359/619, 613; 342/62, 45; 244/3.1, 3.15, 244/3.16
See application file for complete search history.

(56) References Cited

U.S. PATENT DOCUMENTS

| | | | |
|---|---|---|---|
| 5,771,092 A | 6/1998 | Dubois et al. | |
| 6,993,222 B2 | 1/2006 | Mears et al. | |
| 7,138,289 B2 | 11/2006 | Blanchard et al. | |
| 2003/0127558 A1* | 7/2003 | Heizmann-Bartels | ...... 244/3.16 |
| 2005/0087829 A1* | 4/2005 | Merrill et al. | ........... 257/440 |
| 2007/0069109 A1* | 3/2007 | Lee | ............ 250/208.1 |
| 2008/0002192 A1 | 1/2008 | David | |

OTHER PUBLICATIONS

S. Kirkpatrick et al, :Optimization by Simulated Annealing, Downloaded from www.sciencemag.org on Apr. 15, 2008, Science, vol. 220, No. 4598, May 13, 1983, pp. 671-680.
C. P. Chang, et al, "Optimization of a thin-film multilayer design by use of the generalized simulated-annealing method", Optics Letters, vol. 15, No. 11, Jun. 1, 1990, pp. 595-597.
David H. Hilland et al, "Satellite Threat Warning and Attack Reporting", Proceedings of the Aerospace Conference, 1998, pp. 207-217.
Dietmar Knipp et al, "Stacked Amorphous Silicon Color Sensors", IEEE Transactions on Electron Devices, vol. 49, No. 1, Jan. 2002, pp. 170-176.

* cited by examiner

*Primary Examiner*—Thanh X Luu
*Assistant Examiner*—Francis M Legasse, Jr.
(74) *Attorney, Agent, or Firm*—John P. Hohimer

(57) ABSTRACT

A laser warning receiver is disclosed which has up to hundreds of individual optical channels each optically oriented to receive laser light from a different angle of arrival. Each optical channel has an optical wedge to define the angle of arrival, and a lens to focus the laser light onto a multi-wavelength photodetector for that channel. Each multi-wavelength photodetector has a number of semiconductor layers which are located in a multi-dielectric stack that concentrates the laser light into one of the semiconductor layers according to wavelength. An electrical signal from the multi-wavelength photodetector can be processed to determine both the angle of arrival and the wavelength of the laser light.

23 Claims, 7 Drawing Sheets

LASER WARNING RECEIVER TO IDENTIFY THE WAVELENGTH AND ANGLE OF ARRIVAL OF INCIDENT LASER LIGHT

GOVERNMENT RIGHTS

This invention was made with Government support under Contract No. DE-AC04-94AL85000 awarded by the U.S. Department of Energy. The Government has certain rights in the invention.

FIELD OF THE INVENTION

The present invention relates to laser warning receivers for detecting laser sources which are directed at the laser warning receivers, and for identifying an angle of arrival and a wavelength of any received laser light from such sources.

BACKGROUND OF THE INVENTION

Laser sources pose a risk to people either on the ground or piloting an aircraft since they can produce temporary flash blindness or even permanent blindness. Laser sources can also be used to direct munitions and laser-guided missiles; and they can also disable satellite borne imaging systems. To protect against the various threats posed by laser sources, laser warning receivers are needed.

The present invention provides a laser warning receiver which is compact, and which can be used to determine both the angle of arrival and wavelength of an incident laser beam so that counter measures can be taken against the laser threat.

These and other advantages of the present invention will become evident to those skilled in the art.

SUMMARY OF THE INVENTION

The present invention relates to a laser warning receiver which comprises a plurality of optical channels. Each optical channel has optics which comprises a lens and one or more optical wedges, with the optics for each optical channel being optically oriented to receive laser light at an angle of arrival which is different for each optical channel. The optics for each optical channel directs the laser light onto a multi-wavelength photodetector in each optical channel to generate an electrical signal that can be used to identify both the wavelength and the angle of arrival of the laser light. Each optical channel can also include a light baffle located between the optics and the multi-wavelength photodetector.

Each lens and optical wedge can be formed from glass or a polymer. In certain embodiments of the present invention the optics for all of the optical channels can be provided as a molded plate with each lens located on one side of the molded plate and with each optical wedge located on the other side of the molded plate. In some embodiments of the present invention, another molded plate comprising another optical wedge for each optical channel can be located above the molded plate containing each lens.

Each multi-wavelength photodetector can comprise a plurality of semiconductor layers which can be stacked up and spaced apart within a multi-layer dielectric stack. The multi-layer dielectric stack, which can comprise dielectric layers of two different materials (e.g. silicon dioxide and titanium dioxide), functions to separate the laser light according to wavelength and to concentrate a majority of the laser light at each different wavelength into one of the semiconductor layers so that the wavelength of the laser light can be identified. Each semiconductor layer can comprise silicon (e.g. polycrystalline silicon also termed polysilicon) or germanium (e.g. polycrystalline germanium also termed polygermanium). Each semiconductor layer can also optionally include a semiconductor junction therein. A metal mirror can also be located beneath each multi-wavelength photodetector to redirect the laser light back through the multi-wavelength photodetector for a second pass.

The present invention further relates to a laser warning receiver which comprises a plurality of optical channels, with each optical channel receiving laser light from a different angle of arrival. The optical channels comprise a transparent plate that includes a lens for each optical channel on one side of the transparent plate, and an optical wedge for each optical channel on an opposite side of the transparent plate. Each optical channel also comprises a multi-wavelength photodetector to detect the laser light received by that optical channel and to generate therefrom an electrical signal indicative of the angle of arrival of the laser light and the wavelength of the laser light. Each optical channel can further include a baffle to reduce an amount of light that reaches the multi-wavelength photodetector located in that optical channel from angles other than the angle of arrival for that optical channel. In certain embodiments of the present invention, another optical wedge for each optical channel can be located on another transparent plate which is located proximate to the transparent plate containing each lens. This can be useful to increase the angle of arrival for each optical channel.

The multi-wavelength photodetector can comprise a plurality of semiconductor layers which are located within a multi-layer dielectric stack. The multi-layer dielectric stack concentrates a majority of the laser light into one of the semiconductor layers based on the wavelength of the laser light. Each semiconductor layer can include a semiconductor junction, or can be a photoconductive layer. The multi-layer dielectric stack can be divided into a plurality of sections, with one of the sections of the multi-layer dielectric stack separating each adjacent pair of the semiconductor layers, and with each section of the multi-layer dielectric stack comprising a plurality of alternating layers of two different dielectric materials each having a different index of refraction.

The multi-wavelength photodetectors for each optical channel can be located on a substrate which can also include a signal processor which receives the electrical signal from each multi-wavelength photodetector to determine therefrom the angle of arrival of the laser light and the wavelength of the laser light. An alarm can be optionally connected to the signal processor to signal a detection of the laser light.

The present invention also relates to a laser warning receiver which comprises a plurality of optical channels to receive laser light, with each optical channel being optically oriented to receive the laser light from a different angle of arrival. A photodetector is located in each optical channel to generate an electrical signal from the laser light received by that optical channel. The photodetector comprises a plurality of semiconductor layers stacked up within a multi-layer dielectric stack which concentrates a majority of the laser light into one of the semiconductor layers which is determined by a wavelength of the laser light. A signal processor receives the electrical signal from each photodetector and uses the electrical signal to determine the angle of arrival and the wavelength of the laser light.

Each optical channel can include a lens and at least one optical wedge. Each optical channel can also include a baffle to reject light from outside the angle of arrival for that optical channel. Each semiconductor layer can optionally include a semiconductor junction therein, or alternately can be a photoconductive layer.

Additional advantages and novel features of the invention will become apparent to those skilled in the art upon examination of the following detailed description thereof when considered in conjunction with the accompanying drawings. The advantages of the invention can be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several aspects of the present invention and, together with the description, serve to explain the principles of the invention. The drawings are only for the purpose of illustrating preferred embodiments of the invention and are not to be construed as limiting the invention. In the drawings.

DETAILED DESCRIPTION OF THE INVENTION

Figure 1A:
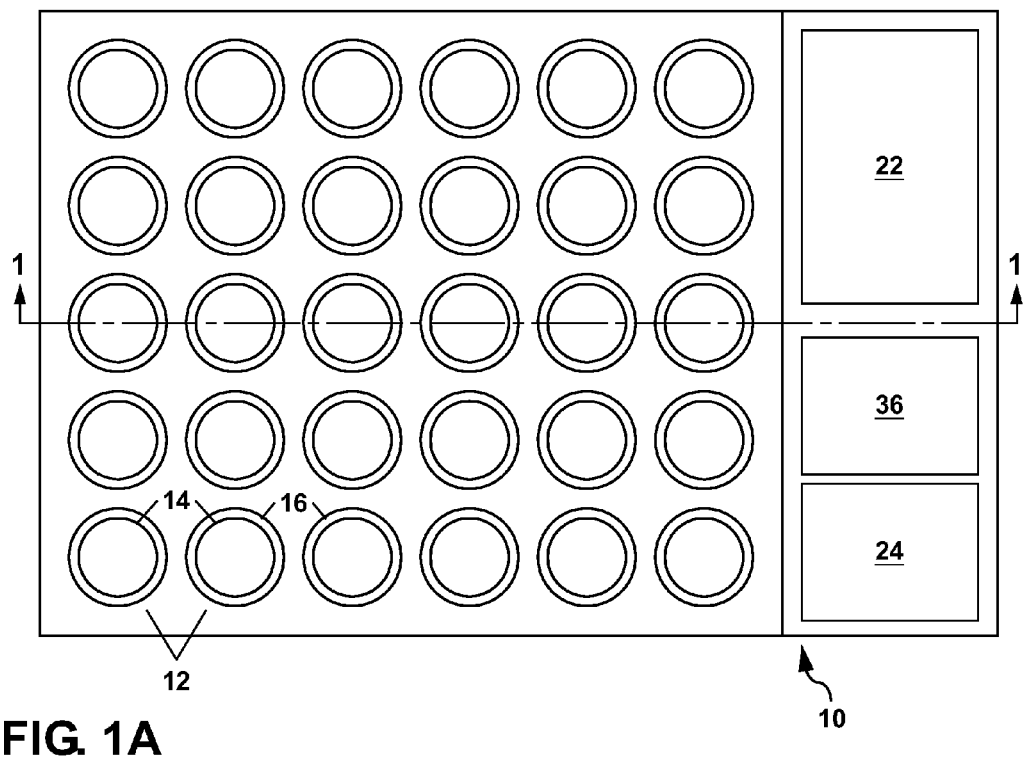
FIG. 1A shows a schematic plan view of a first example of laser warning receiver according to the present invention.
Figure 1B:
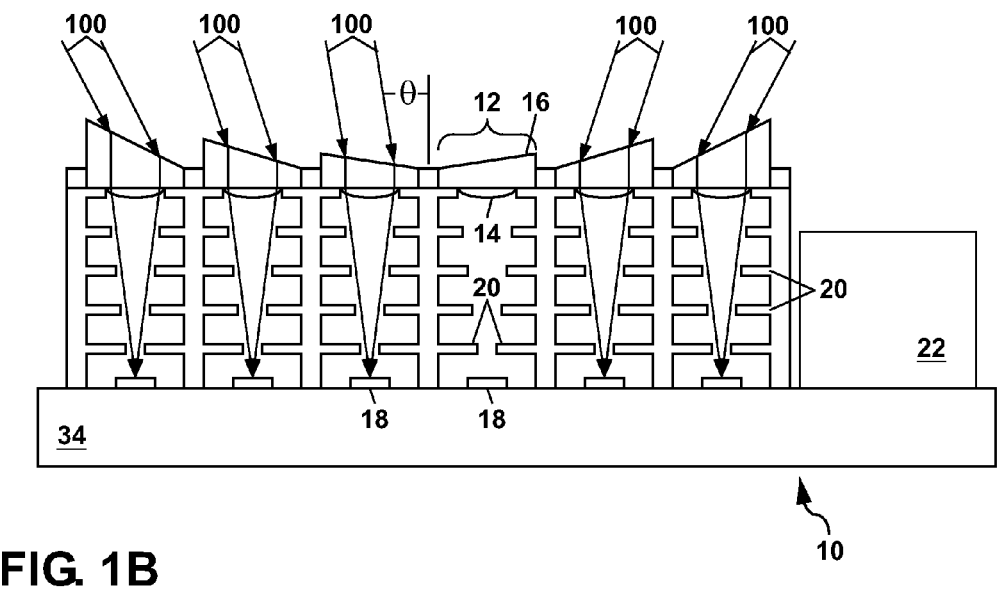
FIG. 1B shows a schematic cross-section view of the device of FIG. 1A along the section line 1-1 in FIG. 1A.

Referring to FIGS. 1A and 1B, there is shown a schematic plan view and a schematic cross-section view, respectively, of a first example of a laser warning receiver 10 formed according to the present invention. The apparatus 10 comprises a plurality of optical channels 12 (also referred to herein as simply channels) which are each optically oriented to receive laser light 100 from a different angle of arrival θ. Laser light 100, which is directed towards the laser warning receiver 10 at the angle of arrival θ for a particular channel 12 can be received by optics which comprises a lens 14 (also termed a microlens) and an optical wedge 16 (also termed a prism).

The optical wedge 16 can be circular or polygonal in plan view as shown in FIG. 1A, and has two non-parallel plane faces as shown in FIG. 1B. The optical wedge 16 functions to change the direction of the incoming laser light 100, which is within the angle of arrival θ for a particular optical channel 12, so that the light 100 is redirected in that channel 12 to being substantially perpendicular to a multi-wavelength photodetector 18 located therein. The lens 14 then focuses or concentrates the laser light 100 onto the multi-wavelength photodetector 18 for detection and identification of both the wavelength of the laser light 100 and the particular channel 12 which received and detected the light 100.

A light baffle 20 is located between the optics and the photodetector 18 in each channel 12 to limit a field of view of the photodetector 18 therein to the angle of arrival θ for that optical channel 12. In this way, the light baffle 20 blocks any laser light which is outside of the angle of arrival θ for each optical channel 12. The light baffle 20 is also useful to block ambient background light (e.g. sunlight) which is outside of the angle of arrival θ for each channel 12. Thus, since the light 100 from a laser source which is directed at the laser warning receiver 10 will generally be collimated with a small beam divergence, the laser light 100 from any given laser source will generally be detected in only one of the optical channels 12 which has an angle of arrival θ properly optically oriented to receive the laser light 100 and to direct the laser light 100 onto the multi-wavelength photodetector 18 in that optical channel 12. As a result, identifying the exact optical channel 12 which receives the laser light 100 will provide an indication of the angle of arrival θ of the laser light 100.

The term "angle of arrival" as used herein refers to a specific angle θ for each optical channel 12 with respect to a direction normal to the photodetector 18 therein, and further includes a narrow angular field of view centered about the angle θ over which light will be received and directed onto the photodetector 18 by the optics (also referred to as a detector field of view). The angle θ for the laser warning receiver 10 can range, for example, between 0 and ±90° in two orthogonal directions to provide an overall field of view of up to 180° in each orthogonal direction.

Each individual optical channel 12 and photodetector 18 therein will be sighted to detect incident light in a specific direction (i.e. a specific angle of arrival θ) with a detector field of view of up to a few degrees (e.g. ±1.5°). In general, the detector field of view for a particular optical channel 12 will be determined by the optics and the size of the photodetector 18 and can be further limited by the baffle 20. As an example, for a photodetector 18 with lateral dimensions of 50 microns (μm) and for a lens 14 having an aperture of 100 μm and a focal length of 1 millimeter (mm), the detector field of view of each optical channel 12 will be about ±1.5° degrees centered about the angle of arrival θ (i.e. θ±1.5°). Up to hundreds or thousands of individual optical channels 12 can be provided in the laser warning receiver 10 of the present invention. For simplicity, only a relatively small number of channels 12 are shown in FIGS. 1A and 1B.

The term "wavelength" as used herein can refer to a specific, well-defined wavelength as in the laser light 100 emitted from a single-frequency laser source or from a gas laser (e.g. a helium-neon laser, or an argon ion laser). The term "wavelength" as used herein can also refer to a band of wavelengths (also termed a wavelength band) which can be, for example, up to a few tens of nanometers wide emitted by a broadband laser source (e.g. a solid-state laser such as a Nd:glass laser, a semiconductor laser array, or an organic dye laser), or by a pulsed laser source (e.g. a mode-locked or Q-switched laser source).

The term "photodetector" as used herein refers to one or more semiconductor layers which absorb light to produce photogenerated carriers (i.e. electrons and holes) which can be collected and used to detect the light. The photogenerated carrier can also be used to change an electrical conductivity of the semiconductor layer(s), with the change in electrical conductivity (termed photoconductivity) being sensed to detect the light. The term "photodetector" as used herein can refer to light detection devices comprising semiconductor layers with or without a semiconductor junction (i.e. a p-n or p-i-n junction) formed therein. A semiconductor junction is useful to set up a space charge in the semiconductor layer(s) to facilitate the collection of photogenerated carriers, but is generally not needed when the photoconductivity of the semiconductor layer(s) is used for the detection of light.

Figure 2:
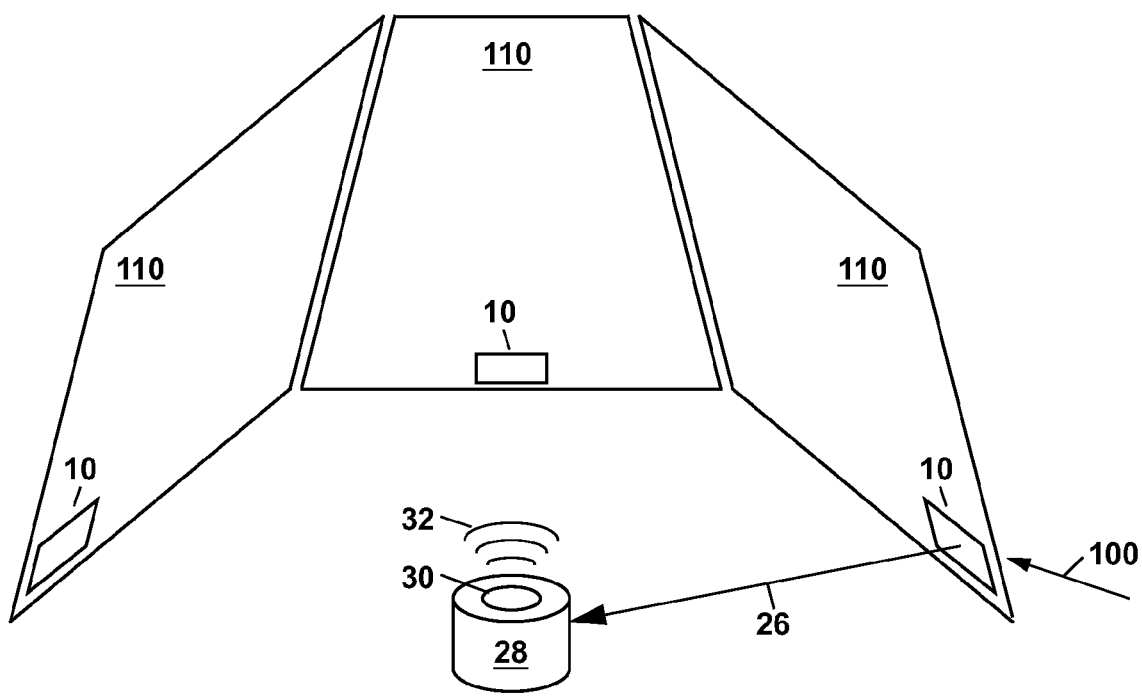
FIG. 2 schematically illustrates a portion of an aircraft cockpit to show how one of the laser warning receivers of the present invention can be attached to each cockpit window and can transmit laser threat information to a console unit which communicates with the aircraft.

Returning to the example of FIGS. 1A and 1B, the exact number of optical channels 12 required for the laser warning receiver 10 will depend upon the particular use of the receiver 10, and on an overall field of view required for the device 10. As an example, when the laser warning receiver 10 is deployed in an aircraft cockpit, a separate laser warning receiver 10 can be attached to each window in the cockpit as schematically illustrated in FIG. 2. Each laser warning receiver 10 can be self-contained with a battery 22 and a radio-frequency (rf) or microwave transmitter 24 to transmit a warning signal 26 to a console unit 28 in the cockpit to communicate with the aircraft and with the pilot whenever an incoming laser beam 100 is detected. The console unit 28 can include an rf or microwave receiver to receive the information from each laser warning receiver 10 and a microprocessor or computer to process the information. The console unit 28 can also be connected to avionics in the aircraft to provide the angle of arrival and wavelength of the incoming laser beam 100 in order to trigger countermeasures against the laser threat or any munitions that may be guided by the laser beam 100.

When incident laser light 100 is detected by one or more of the laser warning receivers 10, an alarm 30 in the console unit 28 or in a cockpit display (not shown) can be triggered to provide an audible and/or visual alarm signal 32 of the laser threat. With an audible alarm signal 32, this can be done, for example, by using a different audible signal for each window 110 and 110' to identify on which window 110 or 110' the laser beam 100 is incident. A visual alarm signal 32 can be displayed either in the cockpit display or on the console unit 28 to provide precise information about the angle of arrival and wavelength of the laser beam 100.

The laser warning receiver 10 located on each side window 110 can have an overall field of view which can be, for example, ±15° in the vertical direction and ±90° in the horizontal direction to protect against airborne laser threats as well as laser threats from the ground. The laser warning receiver 10 located on a front window 110' of the aircraft can have an overall field of view which can be, for example, +5° and −25° in the vertical direction and ±90° in the horizontal direction. To cover the overall field of view for each window 110 and 110', a few hundred (e.g. 700-800) optical channels 12 or more can be provided in each laser warning receiver 10, with each optical channel 12 having a detector field of view of, for example, ±1.5°. Each laser warning receiver 10 can be made very small (e.g. on the order of 1-2 square inches) so as not to obstruct the view through each window 110 and 110'. Each laser warning receiver 10 can also be thin (e.g. 1-2 mm thick), and can be attached to the windows 110 and 110' directly or with a bracket.

After attaching one of the laser warning receivers 10 to each window 110 and 110' of the aircraft cockpit, the laser warning receivers 10 can be calibrated relative to the aircraft. This can be done using an alignment laser source (e.g. a helium-neon laser) which can be pointed to provide laser light 100 incident onto each laser warning receiver 10 at a specific direction. The alignment laser source can be repositioned a number of times and the angle of arrival θ for the incident laser light 100 detected for each position of the laser source using the laser warning receiver 10. This alignment information can be compared with measurements of the position of the incident laser light 100 relative to the aircraft and used to calibrate the angle of arrival θ for the various optical channels 12 which have detected the light 100 from the alignment laser source. The known alignment of the remaining optical channels 12 due to the optical orientation of each optical channel 12 in the laser warning receiver 10 can be used together with the alignment information to generate calibration information about the exact position of each channel 12 in each laser warning receiver 10 relative to the aircraft. This calibration information can be stored in the console unit 28.

In the example of FIGS. 1A and 1B, the substrate 34 can comprise, for example, silicon or germanium when the transmitter 24 and signal processing electronics 36 (also referred to herein as a signal processor 36) are formed on the substrate 34 as an integrated circuit (IC). The signal processor 36 receives electrical signals from each photodetector 18 and uses these electrical signals to determine the wavelength and angle of arrival of the laser light 100. The angle of arrival of the laser light 100 can be determined from the optical channels 12 which have detected the incoming laser beam 100 since in these channels 12 an electrical signal will be produced which is higher than a background signal level of the remaining optical channels 12 which is due to noise (e.g. from the detection of ambient light). The wavelength of the laser light 100 can be determined from a plurality of stacked detector elements 40 within each photodetector 18 as will be described in detail hereinafter. Once the signal processor 36 has identified the wavelength and angle of arrival of the incoming laser beam 100, this information can be provided to the transmitter 24 and sent to the console unit 28. In other embodiments of the present invention, the substrate 34 can comprise glass, plastic, resin, ceramic or any material upon which electrical traces can be formed to provide electrical connections between the various elements 18, 22, 24 and 36 on the substrate 34. The photodetectors 18, transmitter 24 and signal processor 36 can each be fabricated as hybrid devices and then attached to any of the above substrates 34 to form the laser warning receiver 10.

In the example of FIGS. 1A and 1B, the optics (i.e. the lenses 14 and optical wedges 16) can be formed of glass, plastic (e.g. a thermoplastic polyolefin resin also referred to as a cycloolefin resin), fused silica, sapphire, etc. These lenses 14 and optical wedges 16 can be individually fabricated (e.g. by molding, diamond turning or polishing), or can be formed together as a unit (i.e. with each lens 14 and accompanying optical wedge 16 being formed together). Each lens 14 and optical wedge 16 can then be assembled onto the baffle 20 and aligned to provide the particular angle of arrival for each optical channel 12, and then permanently attached to the baffle 20. All of the baffles 20 can be formed together as a single unit.

Figure 6A:
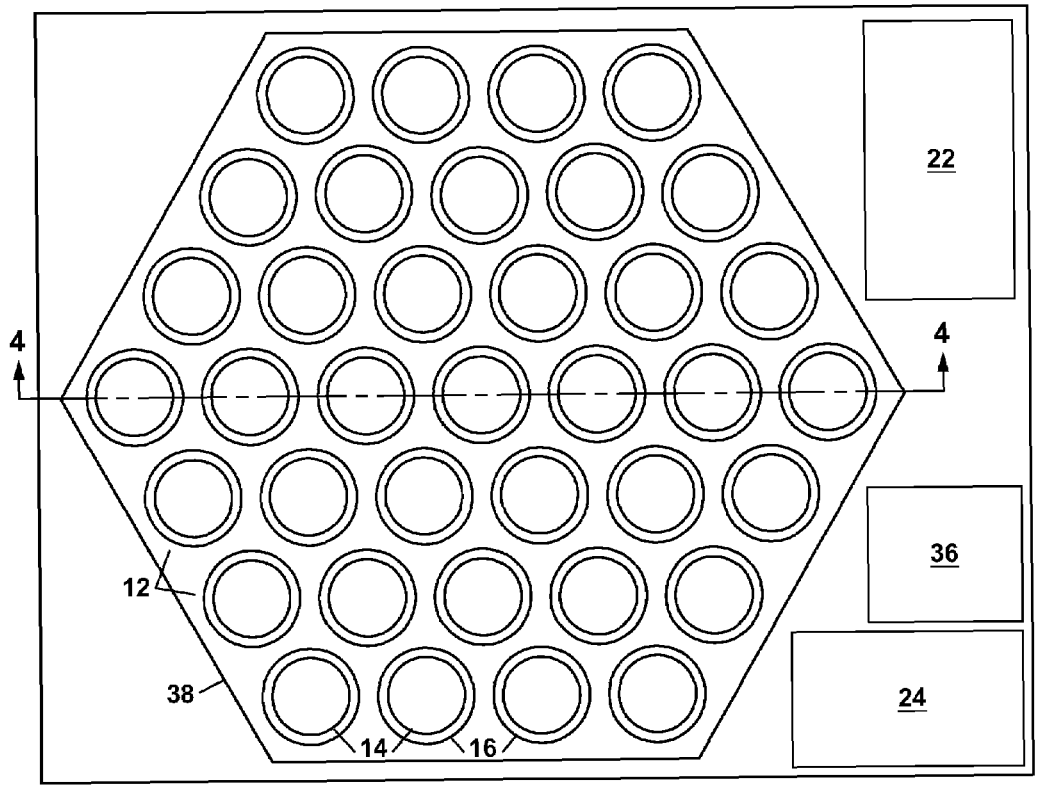
FIG. 6A shows a schematic plan view of a second example of laser warning receiver according to the present invention.
Figure 6B:
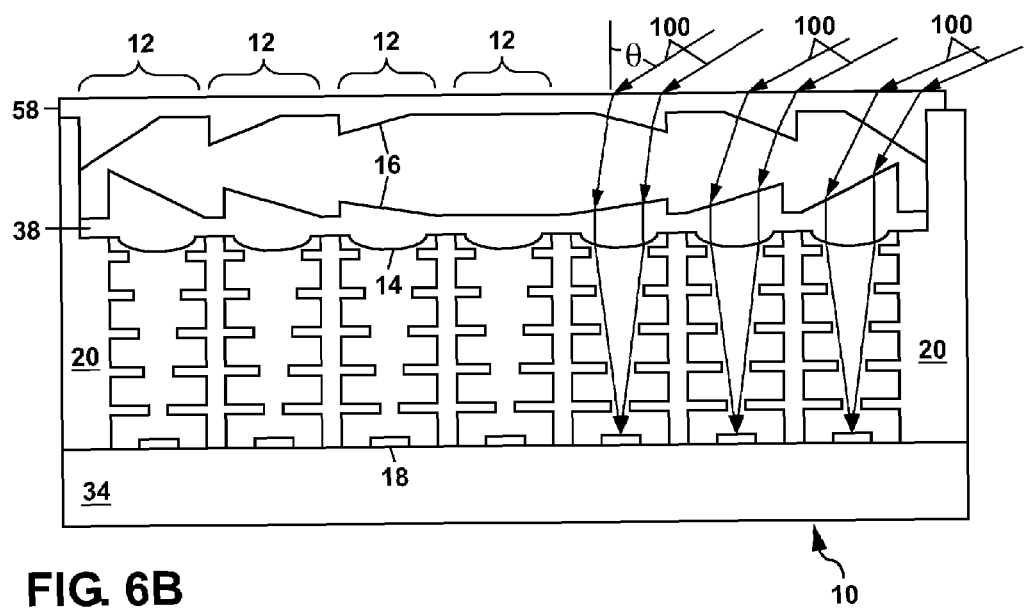
FIG. 6B shows a schematic cross-section view of the laser warning receiver of FIG. 6A along the section line 4-4 in FIG. 6A.

In some embodiments of the present invention, all of the lenses 14 and optical wedges 16 in FIGS. 1A and 1B can be formed together as a transparent plate 38 (see FIG. 6B). This can be done, for example, by a diamond turning or molding (i.e. replication) process. The diamond turning process can be used to form a master set of optics containing all of the lenses 14 and optical wedges 16 for the laser warning receiver 10. This master set of optics can then be used to produce a molds which can then be used to mold each side of the plate 38 from glass or plastic. This can be advantageous to simplify assembly and reduce the manufacturing cost for the laser warning receiver 10.

In the example of FIGS. 1A and 1B, the optical baffles 20 can be stepped as shown in FIG. 1B to limit the detector field of view and thereby block any laser light 100 or ambient background light which is outside of the detector field of view. The optical baffles 20 can be formed as a unit from a plurality of layers (e.g. comprising a black polymer material) which can be stacked up and laminated together. The baffles 20 can also be formed by LIGA which utilizes a series of repeated lithography, electroplating and molding processes to built up the structure of the optical baffles 20 layer by layer from a metal or metal alloy. Using LIGA, the optical baffles 20 can be formed on a sacrificial substrate which can then be removed. The surfaces of the optical baffles 20 can then be blackened to reduce any reflection of the incident laser light 100. The baffles 20 can also be molded as a single unit (e.g. using the black polymer material). The baffles 20 can also optionally include a textured surface which is useful to reduce light scattering from the baffles 20. An overall thickness of the optical baffles 20 will depend upon the focal length of the lens 14 and can be, for example, 1 mm.

Figure 3A:
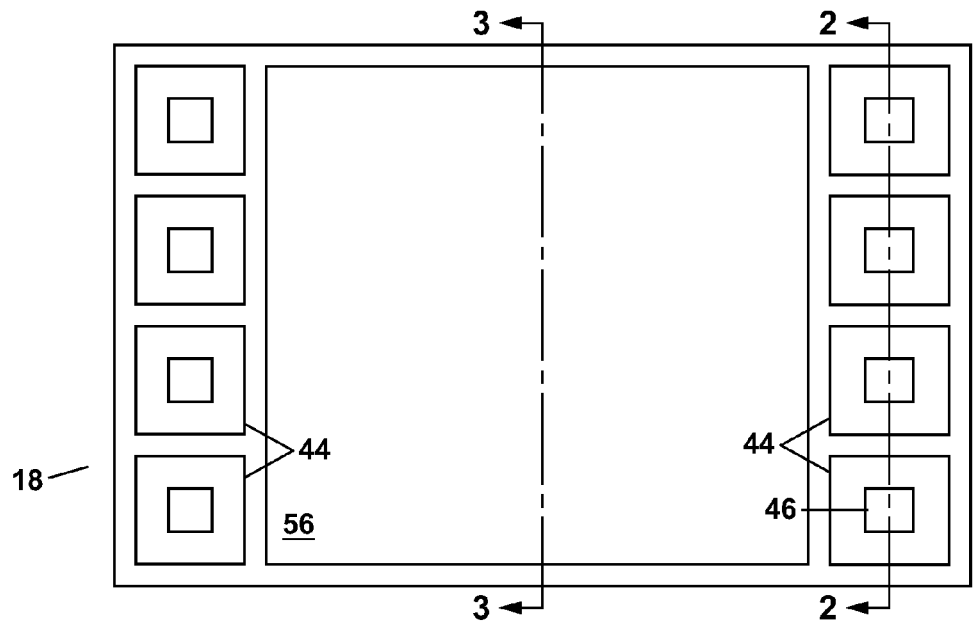
FIG. 3A shows a schematic bottom view of an example of a multi-wavelength photodetector formed according to the present invention.
Figure 3B:
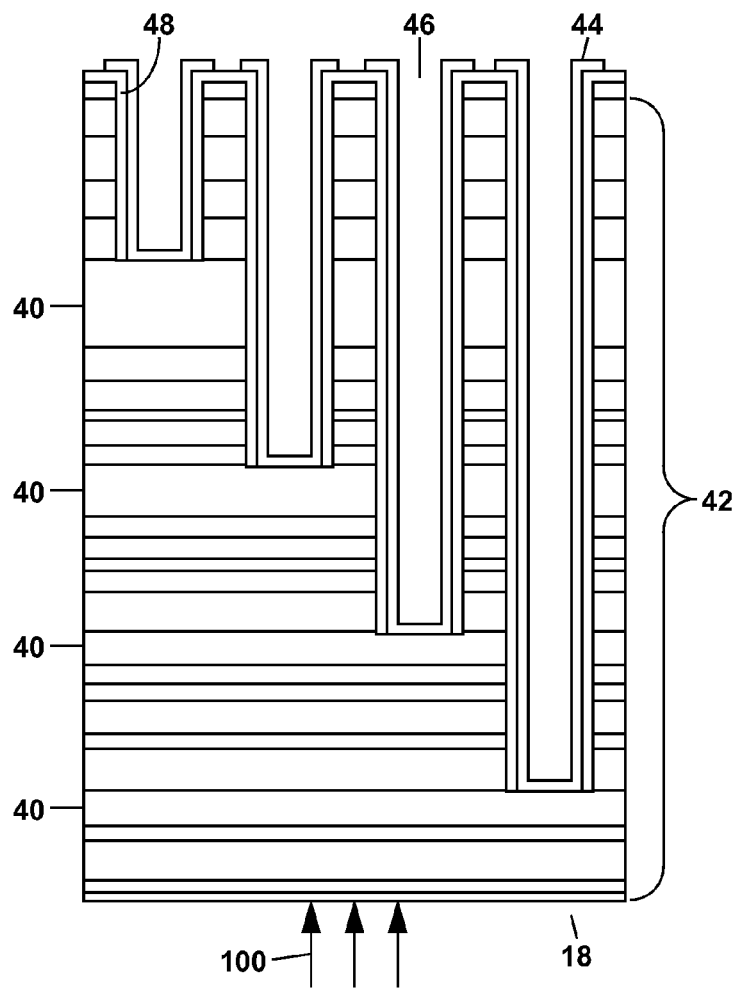
FIG. 3B shows a schematic cross-section view of the multi-wavelength photodetector of FIG. 3A along the section line 2-2 in FIG. 3A to illustrate how each semiconductor layer within the multi-wavelength photodetector can be independently electrically contacted.
Figure 3C:
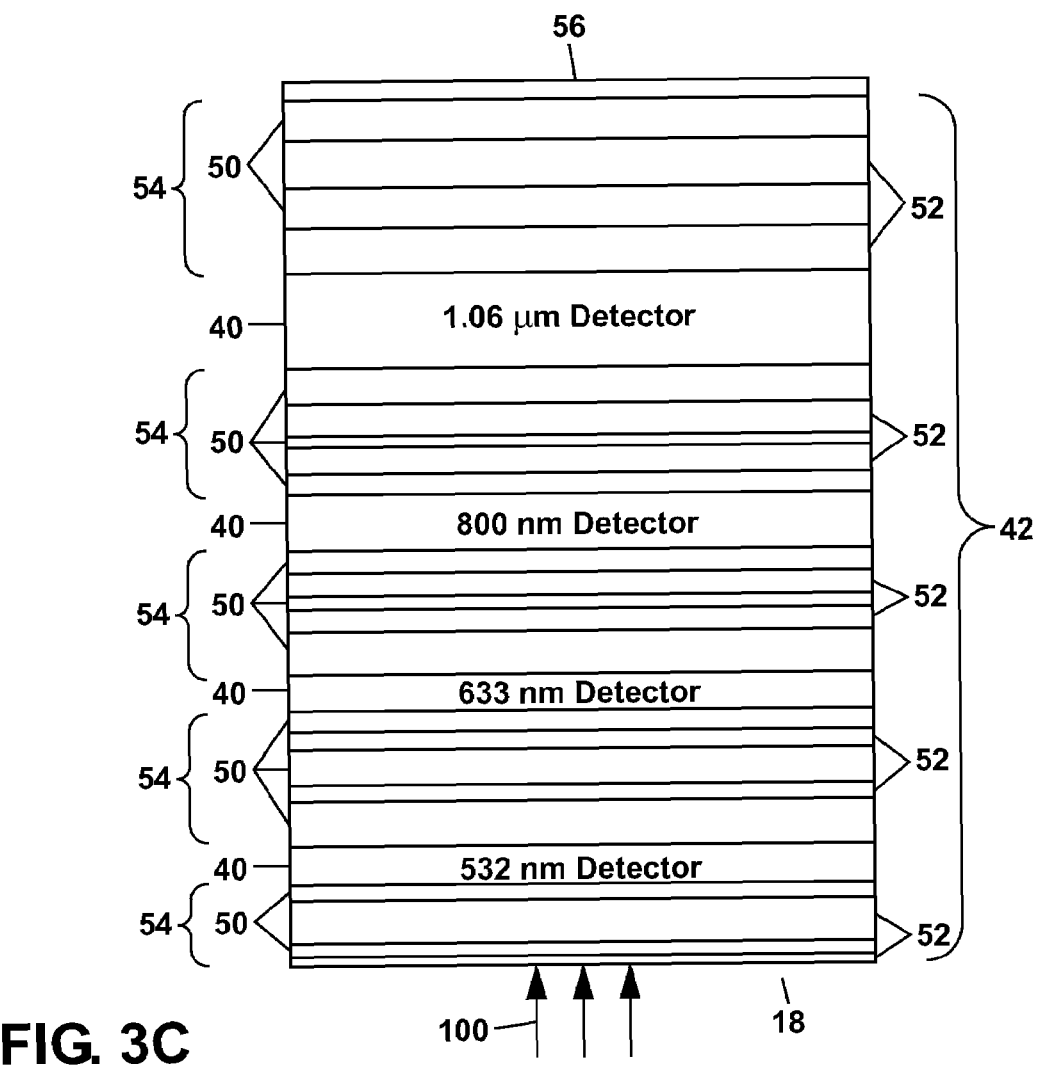
FIG. 3C shows a schematic cross-section view of the multi-wavelength photodetector of FIG. 3A along the section line 3-3 in FIG. 3A to show details of the various semiconductor layers which form independently-contacted detectors for four different laser wavelengths (532 nm, 633 nm, 800 nm and 1.06 μm), and to show details of the multi-layer dielectric stack wherein the semiconductor layers are located.
Figure 4A:
FIGS. 4A-4D show calculated curves of the electromagnetic field intensity for different laser wavelengths to illustrate how the multi-layer dielectric stack functions to concentrate each specific laser wavelength into a different semiconductor layer as identified by each pair of vertical dashed lines and the accompanying labels which identify the wavelengths of the laser light for which each semiconductor layer forms a photodetector.
Figure 4B:
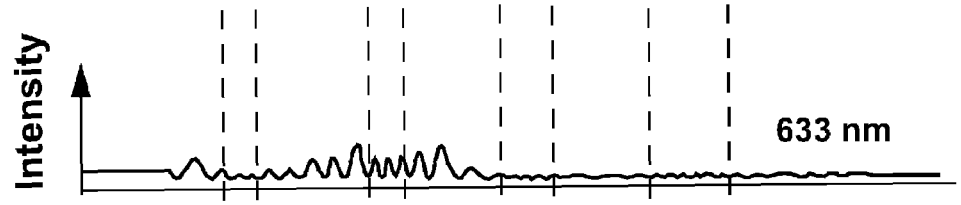
Figure 4C:
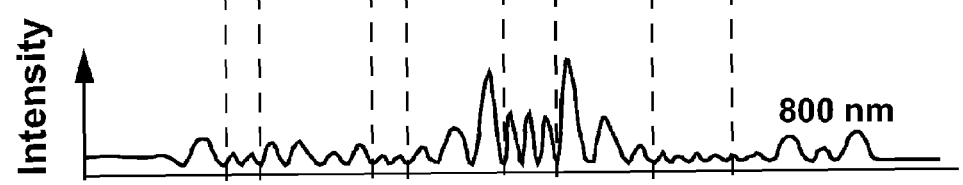
Figure 4D:
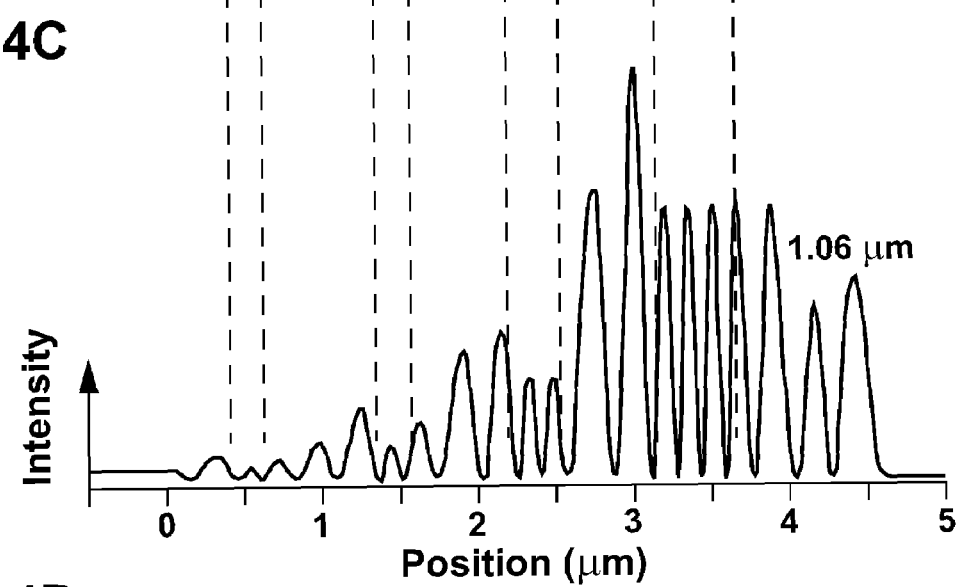

In the example, of FIGS. 1A and 1B, the photodetector 18 can be a multi-wavelength photodetector 18 which comprises a plurality of semiconductor layers 40 which are stacked up and spaced apart within a multi-layer dielectric stack 42 (see FIG. 3C). Each semiconductor layer 40 can form a photoconductive detector without any semiconductor junction (i.e. a p-n or p-i-n junction) formed therein, or alternately can include a semiconductor junction. The multi-layer dielectric stack 42 concentrates a different wavelength of the laser light 100 into each semiconductor layer 40 so that the wavelength of the laser light 100 can be identified from the particular semiconductor layer 40 that produces an electrical signal in response to the laser light 100. In general, each semiconductor layer 40 within the multi-wavelength photodetector 18 can independently electrically contacted so that the photodetector 18 can be used to detect up to n different wavelengths of laser light 100 where n is the number of semiconductor layers 40 provided in the photodetector 18.

FIGS. 3A-3C schematically illustrate an example of a multi-wavelength photodetector 18 which can be used to detect four different wavelengths of laser light 100. This photodetector 18 will allow the detection and identification of laser light 100 at exemplary wavelengths at 532 nanometers (nm) corresponding to a frequency-doubled neodymium (Nd) laser, at 633 nm corresponding to a helium-neon laser, at 800 nm corresponding to a semiconductor diode laser or a semiconductor diode array laser, and at 1.06 microns corresponding to a neodymium (Nd) laser (e.g. an Nd:YAG laser, or a Nd:glass laser). The above wavelengths and laser types are given by way of example only. Those skilled in the art will understand that there are many different types of lasers emitting at many different wavelengths which pose a laser threat which can be sensed using the laser warning device 10 of the present invention. In general, the multi-wavelength photodetector 18 of the present invention can be tailored to detect laser light 100 at a number n different wavelengths which can be located anywhere in the electromagnetic spectrum from the ultraviolet region to the near-infrared region (e.g. from 0.3-1.1 µm when the semiconductor layers 40 comprise silicon; and from 0.6-1.9 µm when the semiconductor layers comprise germanium).

FIG. 3A shows a schematic bottom view of the multi-wavelength photodetector 18 which can include a plurality of pairs of electrical contacts 44 with each pair of the contacts 44 being used to independently contact a different one of the semiconductor layers 40. By locating the contacts 44 at the bottom of the photodetector 18, the photodetector 18 can be attached to the substrate 34 using a plurality of solder bump bonds.

The electrical contacts 44 for each semiconductor layer 40 can be formed as shown in FIG. 3B which is a schematic cross-section view along the section line 2-2 in FIG. 3A. When each semiconductor layer 40 forms a photoconductive photodetector, the contacts 44 can be formed by etching a pair of wells 46 down to expose each end of each semiconductor layer 40. When each semiconductor layer 40 includes a semiconductor p-n or p-i-n junction therein, the wells 46 for each semiconductor layer 40 can be etched down to expose a p-type-doped region and an n-type-doped region of each semiconductor layer 40 to form the contacts 44 to that layer 40. The p-type-doped and n-type-doped regions can be formed during deposition of the semiconductor layers 40.

The etching of the wells 46 for either of the above cases can be performed, for example, by using multiple reactive ion etching steps. After etching the wells 46 for the various electrical contacts 44, an electrically-insulating layer 48 (e.g. comprising silicon dioxide or silicon nitride) a few tenths of a micron thick can be conformally deposited over the bottom of the multi-wavelength photodetector 18, and in the wells 46. This can be done by chemical vapor deposition (CVD), or by plasma-enhanced CVD. Another reactive ion etching step can then be performed to etch through the electrically-insulating layer 48 at the bottom of each well 46 to expose each semiconductor layer 40. Metal (e.g. comprising aluminum, titanium, chromium, copper, tungsten, gold, platinum, and combinations thereof) can then be deposited in each well 46 to form the contacts 44 for the photodetector 18. The metal can optionally be deposited to completely fill in the wells 46. The various wells 46 will generally have a depth of up to a few microns (e.g. 3-4 µm) depending upon an overall thickness for the multi-layer dielectric stack 42. The width of the wells 46 can be, for example, up to about 10 µm or more depending upon the lateral dimensions of the multi-wavelength photodetector 18. It should be noted that in FIG. 3B the height of the photodetector 18 has been greatly exaggerated relative to its width to show the many layers which make up the photodetector 18.

FIG. 3C shows a schematic cross-section view of the photodetector 18 along the section line 3-3 in FIG. 3A to show the construction of the multi-layer dielectric stack 42 and the location of the semiconductor layers 40 therein. The multi-layer dielectric stack 42 comprises dielectric layers of a first dielectric material 50 (also referred to herein as a first dielectric layer 50) and a second dielectric material 52 (also referred to herein as a second dielectric layer 52) which are stacked up in an alternating arrangement in different sections 54 which are located about each semiconductor layer 40 to concentrate a specific wavelength of the laser light 100 into that layer 40 for detection. The dielectric materials 50 and 52 in each section 54 are electrically insulating so that the adjacent semiconductor layers 40 will be electrically insulated from each other. This allows each semiconductor layer 40 to be independently electrically contacted as previously described with reference to FIG. 3B and operated as a separate light detector.

In each section 54 of the multi-layer dielectric stack 42, the first dielectric material 50 has an index of refraction which is different from the index of refraction of the second dielectric material 52. As an example, the first dielectric material 50 can comprise silicon dioxide ($SiO_2$) with an index of refraction of about 1.46; and the second dielectric material 52 can comprise titanium dioxide ($TiO_2$) with an index of refraction of about 2.6. Other combinations of dielectric materials known to the art can be used to form the multi-layer dielectric stack 42.

The dielectric layers 50 and 52 and the semiconductor layers 40 (e.g. polycrystalline silicon, or polycrystalline germanium also termed polygermanium) can be deposited by CVD. This can be done on a sacrificial substrate which can then be removed. Alternately the deposition of the layers 40, 50 and 52 can be performed on a transparent substrate (e.g. glass, fused silica, or sapphire) which can be left in place in the completed multi-wavelength photodetector 18. A plurality of photodetectors 18 can be batch fabricated on a common substrate and then singulated to form the individual photodetectors 18.

In some embodiments of the present invention, the multi-wavelength photodetectors 18 can be fabricated directly on the substrate 34. When this is done, electrical connections to each semiconductor layer 40 can be made from a top side of the multi-wavelength photodetector 18. This can be done, for example, by etching a plurality of steps down through the multi-layer dielectric stack 42 to expose the various semiconductor layers 40, metallizing the exposed semiconductor layers 40 to form a pair of contact pads for each layer 40, and then making electrical connections to the contact pads using wire bonds.

A metal mirror 54 can be optionally formed on the bottom of the multi-wavelength photodetector 18 to reflect any of the laser light 100 that is transmitted through the multi-layer dielectric stack 42 for a second pass through the photodetector 18 to increase the absorption of the light 100 in the various semiconductor layers 40. This is especially beneficial for the 1.06 μm detector in FIG. 3C due to the relatively small absorption of polysilicon at this wavelength. The metal mirror 56 can comprise the same metal (e.g. aluminum) which is used to form the electrical contacts 44, or can be a different metal (e.g. silver, gold or copper) which can be deposited separately by evaporation or sputtering using a shadow mask.

In FIG. 3C, the semiconductor layers 40 are arranged so that the laser light 100 is first absorbed into the semiconductor layer 40 which forms a photodetector for the lowest wavelength at 532 nm. This semiconductor layer 40 is labelled as the 532 nm detector in FIG. 3C. The laser light 100 which passes through the 532 nm detector is then incident onto the semiconductor layer 40 which is designed to detect the next highest wavelength (i.e. 633 nm) which forms a 633 nm detector as labelled in FIG. 3C. A third semiconductor layer 40 which encounters the laser light 100 forms an 800 nm detector; and a fourth semiconductor layer 40 forms a 1.06 μm detector as labelled in FIG. 3C. The exact thickness of each semiconductor layer 40 can be selected according to the absorption of the semiconductor material used for the layers 40 at each wavelength of the laser light 100. Thus, when the semiconductor material is polysilicon (i.e. polycrystalline silicon), a larger thickness will be required for absorbing the laser light 100 at the 1.06 μm wavelength due to a relatively low optical absorption of the polysilicon for this wavelength. As an example, the thicknesses of the semiconductor layers 40 for the 532 nm detector and the 633 nm detector can each be about 0.22 μm in the example of FIG. 3A-3C. The thickness for the semiconductor layer 40 for the 800 nm detector can be about 0.33 μm in this example; and the thickness for the layer 40 for the 1.06 μm detector can be about 0.52 μm. When the multi-wavelength photodetector 18 is used to detect other laser wavelengths or when other semiconductor materials (e.g. polygermanium) are used for the photodetector 18, the thickness of each semiconductor layer 40 can be selected to be sufficiently thick to absorb a majority of the laser light 100 at a specific wavelength for that semiconductor layer 40 while, at the same time, allowing most of the laser light 100 at the other higher wavelengths for which the photodetector 18 is designed to be transmitted through that layer 40.

With the semiconductor material and thicknesses for each semiconductor layer 40 initially selected, an alternating arrangement of dielectric layers 50 and 52 in each section 54 of the multi-layer dielectric stack 42 can be provided as shown in FIG. 3C. The alternating dielectric layers 50 and 52 form a resonant cavity about each semiconductor layer 40, with a quality factor (Q) of the resonant cavity depending upon how strong the absorption of the laser light 100 is for each layer 40. At the same time, the alternating dielectric layers 50 and 52 must transmit most of the laser light 100 which is not being absorbed in a particular semiconductor layer 40.

To determine the various layer thicknesses for the alternating dielectric layers 50 and 52, the number of layers in each section 54 and in the overall multi-layer dielectric stack 42 must be initially selected. In the example of FIGS. 3A-3C, the total number of layers 50 and 52 in the stack 42 is twenty nine, with each section 54 having five alternating layers 50 and 52 except for a final section 54 adjacent to the metal mirror 56 which has only four alternating layers 50 and 52. The number of layers 50 and 52 in the stack 42 and in each section 54 is somewhat arbitrary in that additional pairs of the alternating dielectric layers 50 and 52 can be added to one or more of the sections 54 in other embodiments of the present invention.

Once the number of the alternating dielectric layers 50 and 52 for each section 54 and for the overall multi-layer dielectric stack 42 is selected, the exact thickness of each dielectric layer 50 and 52 can be optimized to concentrate a specific wavelength of the laser light 100 into each semiconductor layer 40 as shown in FIG. 3C. This can be done by using a computational model in the form of a simulated annealing algorithm which randomly varies the thicknesses of each of the dielectric layers 50 and 52 and then calculates the percentage of the laser light 100 at each wavelength 532 nm, 633 nm, 800 nm and 1.06 μm which is concentrated into each semiconductor layer 40. Simulated annealing algorithms which are an optimization method for finding the global minimum of a nonlinear and multivariable function are well-known in the art (see e.g. S. Kirkpatrick, et al., "Optimization by Simulated Annealing," *Science*, vol. 220, pp. 671-680, 13 May 1983; C. P. Chang et al., "Optimization of a Thin-Film Multilayer Design by Use of the Generalized Simulated-Annealing Method," *Optics Letters*, vol. 15, pp. 595-597, Jun. 1, 1990; U.S. Pat. No. 6,993,222).

With the simulated annealing algorithm, a merit function is initially constructed which will be used to force each wavelength of the laser light 100 to be predominantly absorbed in only one semiconductor layer 40, with that semiconductor layer 40 being different for each different wavelength of the laser light 100. An initial set of thicknesses for all of the dielectric layers 50 and 52 can then be arbitrarily selected.

The electromagnetic field intensity for the laser light 100 at each wavelength is then calculated as the light 100 propagates through the multi-layer dielectric stack 42. This calculated electromagnetic field intensity can be used together with the absorption of each semiconductor layer 40 at each wavelength of the laser light 100 to calculate the percent absorption of each wavelength of the laser light 100 in each layer 40 to determine the merit function for that initial set of thicknesses of the layers 50 and 52 in the dielectric stack 42. If a figure of merit determined by the merit function is not deemed acceptable (i.e. does not concentrate a majority of each wavelength of the laser light 100 into the semiconductor layer 40 which forms a detector for that wavelength), then a new set of thicknesses for the dielectric layers 50 and 52 can be selected and the electromagnetic field intensity for each wavelength of the laser light 100 is re-calculated. This process is repeated until the figure of merit is acceptable. The simulated annealing algorithm, which provides an ability to find a global maximum in the presence of many local maxima, generates an optimal set of layer thicknesses for all of the dielectric layers 50 and 52 in the multi-layer dielectric stack 42 so that a majority of the laser light 100 at each wavelength will be localized within a single semiconductor layer 40 for detection and identification of that wavelength.

FIGS. 4A-4D schematically illustrate the calculated electromagnetic field intensity of the laser light 100 for the various wavelengths 532 nm, 633 nm, 800 nm and 1.06 µm as a function of position in the dielectric stack 42 after optimization of the structure of the multi-layer dielectric stack 42 using the simulated annealing algorithm. In FIGS. 4A-4D, the locations of the various polysilicon semiconductor layers 40 are indicated by a pair of vertical dashed lines and a label which indicates the wavelength for which each layer 40 forms a detector. As previously mentioned, the dielectric layers 50 and 52 about each semiconductor layer 40 form a resonant cavity about that layer 40 to concentrate one of the wavelengths of the laser light 100 therein. The influence of the resonant cavity enclosing each semiconductor layer 40 can be seen in FIGS. 4A-4D as an interference pattern (i.e. standing waves) of the electromagnetic field intensity for each wavelength of the laser light 100. The Q of the resonant cavity can also be seen in FIGS. 4A-4D to increase for each successive semiconductor layer 40 as manifested by the increase in intensity of the laser light 100 at the location of the semiconductor layer 40 designed to detect that wavelength of the laser light 100. This increased Q is necessary to compensate for the reduced absorption of the polysilicon semiconductor layers 40 with increasing wavelength.

Figure 5:
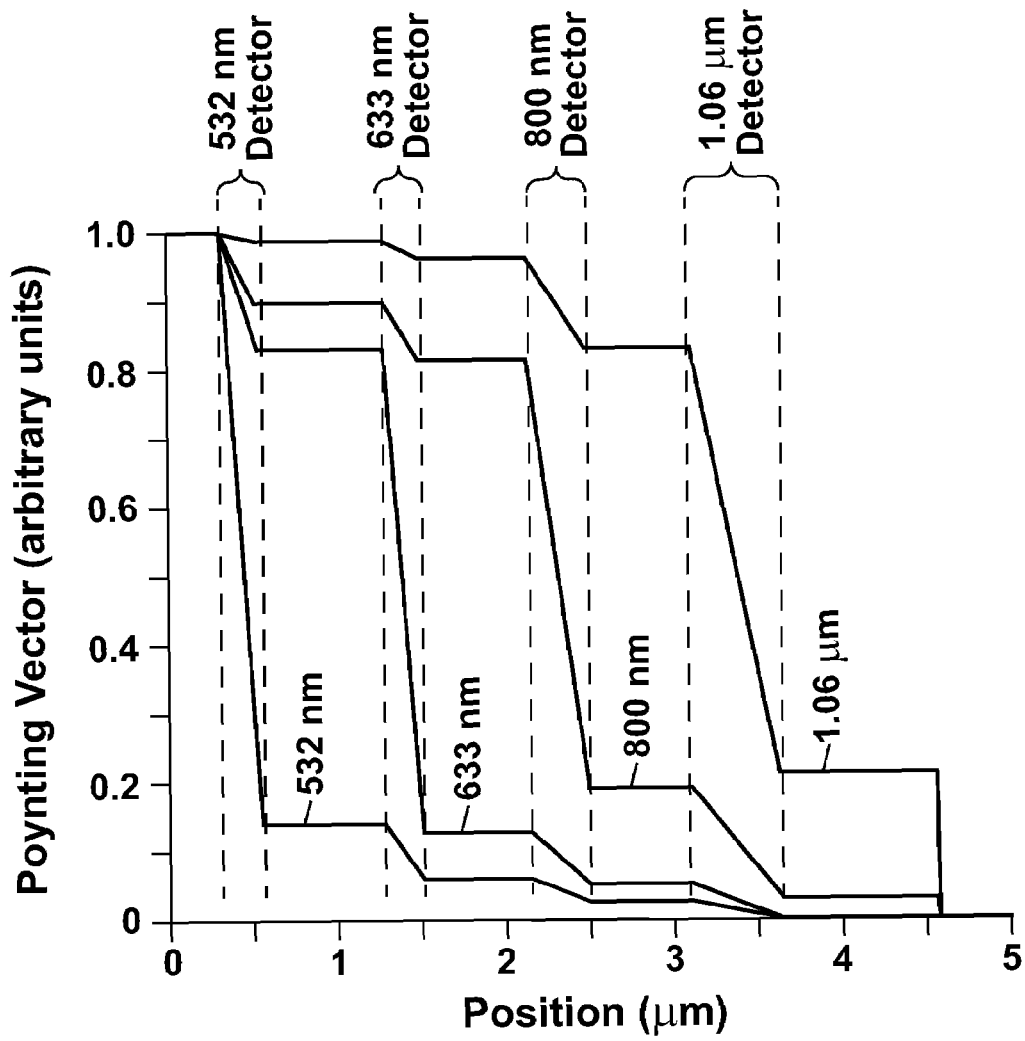
FIG. 5 shows calculated curves of the Poynting vector which represents the amount of optical power at each wavelength of the laser light. The large change in the Poynting vector for each wavelength of the laser light across the semiconductor layer which functions as a detector for that wavelength shows that a majority of the optical power for each wavelength of the laser light is concentrated into only one of the semiconductor layers.

FIG. 5 presents curves of the calculated Poynting vector, which represents a flow of energy in the electromagnetic field of the laser light 100, for a single pass through the multi-wavelength photodetector 18 of FIGS. 3A-3C. In FIG. 5, the Poynting vector can be seen to decrease by about 60% or more for each wavelength of the laser light 100 across the semiconductor layer 40 designed to detect that wavelength. This shows that a majority of the laser light 100 for each wavelength is absorbed into and detected by only one of the semiconductor layers 40.

In the multi-wavelength photodetector 18, the detection of the laser light 100 in a particular semiconductor layer 40 will produce an electrical signal which can be used to provide an indication of the wavelength of the detected laser light 100. Thus, for example, if the only semiconductor layer 40 in the multi-wavelength photodetector 18 which produces a substantial electrical signal in response to the incident laser light 100 is the 633 nm detector layer 40, then the wavelength of the laser light 100 can be identified as being at 633 nm. In the laser warning receiver 10 of the present invention, the electrical signals from each semiconductor layer 40 can be monitored and compared to each other to provide a unique signature for the detection of each different wavelength of the laser light 100. Thus, in the above example for the detection of laser light 100 at 633 nm, the 633 nm detector layer 40 should provide a relatively high level electrical signal while all of the remaining semiconductor layers 40 (i.e. the 532 nm detector layer, the 800 nm detector layer, and the 1.06 µm detector layer) should provide a relatively low level electrical signal. The electrical signal from each semiconductor layer 40 in the multi-wavelength photodetector 18 can be a photocurrent signal; or alternately the electrical signal can arise from a change in photoconductivity of the semiconductor layer 40.

Different patterns of the electrical signals from the various semiconductor layers 40 in the multi-wavelength photodetector 18 can also be used to identify received laser light 100 which has a wavelength that is different from the wavelengths shown in the example of FIGS. 3C, 4 and 5. Thus, for example, a laser source emitting light 100 at a wavelength of 900 nm may not be optimally suited for detection by any of the 532 nm, 633 nm, 800 nm and 1.06 µm detectors in the example of FIGS. 3C, 4 and 5, but can, nevertheless, be identified from a unique pattern of the electrical signals which will be produced by these four detectors. This unique pattern of the electrical signals produced by the four detectors above can be compared against a library of calculated or experimentally measured signal patterns, which can be stored in memory in the console unit 28 or in the aircraft, to determine that the received laser light 100 is at a wavelength of 900 nm. Thus, the laser warning receiver 10 of the present invention is useful to detect a wide range of wavelengths of the laser light 100 besides the exact wavelengths for which the multi-wavelength photodetector 18 is designed.

In the laser warning receiver 10, the electrical signals from each multi-wavelength photodetector 18 can be monitored using the signal processor 36 which can include an amplifier to receive and amplify the electrical signal from each semiconductor layer 40. The signal processor 36 can further include a thresholding circuit to receive the amplified electrical signal from each semiconductor layer 40 in each multi-wavelength photodetector 18 to sense when the amplified electrical signal is above a predetermined threshold level to indicate the detection of incident laser light 100 in the optical channel 12 containing that photodetector 18. The thresholding circuit can also be used to discriminate against noise including any ambient background light which is detected.

The signal processor 36 can also optionally include circuitry to determine whether the incident laser light 100 is continuous, modulated, or pulsed and to determine a modulation frequency or encoding of the incident laser light 100. This can be useful to identify the type of laser source generating the laser light 100. In some cases this can involve comparing a signature of the detected laser light 100 against a library of known laser threats (e.g. from laser-guided weapon systems) which can be stored either in memory in the console unit 28, or in the aircraft.

The signal processor 36 can further include a memory (e.g. a floating point gate array) to store information related to the detection of the laser light 100. This can allow repeated measurements of the electrical signals from each photodetector 18 to provide discrimination against false positives. The provision of a memory capability in the signal processor 36 is also useful for determining the source of the electrical signal (i.e. the exact optical channel 12 and the exact detector layer 40) which are needed to determine the angle of arrival and the wavelength of the incident laser light 100.

In the laser warning receiver 10 of the present invention, the electrical signal from each multi-wavelength photodetector 18 can be used to identify both the angle of arrival and the wavelength of the received laser light 100. The wavelength of the received laser light 100 can be identified as previously described. The angle of arrival can be determined from the particular optical channel 12 in which the laser light 100 is detected at any instant in time. Thus, the transmitter 24 needs only to transmit to the console unit 28 information (e.g. a channel number) about which optical channel 12 has detected the incident laser light 100, and one or more processed electrical signals produced by the multi-wavelength photodetector 18 in that optical channel 12. The console unit 28 can then use this information together with the calibration information stored in the console unit 28 to identify the wavelength, and the precise angle of arrival of the laser light 100 relative to the aircraft. Repeated measurements of the detected laser light 100 as the aircraft moves can be used to pinpoint the location of the laser source with greater accuracy by triangulation. It should also be noted that the laser threat warning receiver 10 of the present invention is capable of determining the angle of arrival and wavelength of laser light 100 from multiple laser sources since each optical channel 12 operates independently.

FIGS. 6A and 6B schematically illustrate in plan view and in cross-section view, respectively, a second example of the laser warning receiver 10 of the present invention. This example of the present invention is similar to that of FIGS. 1A and 1B except that the various optical channels 12 have been arranged in a close-packed configuration; and the lenses 14 and optical wedges 16 have been formed in a transparent plate 38. A lens 14 for each optical channel 12 can be molded onto one side of the plate 38 as shown in FIG. 6B, and an optical wedge 16 for each channel 12 can be molded onto the other side of the plate 38.

Another transparent plate 58 can be optionally included in the device 10 as shown in FIG. 6B to provide an additional optical wedge 16' for each optical channel 12. The provision of this additional plate 58 in the laser warning receiver 10 of FIGS. 6A and 6B is useful to increase the angle of arrival θ for each optical channel 12 as shown by the arrows which depict rays of laser light 100 incident on several of the optical channels 12 along the angles of arrival θ for these channels 12. The plate 58 has been omitted from FIG. 6A to better show details of the underlying plate 38 including the various lenses 14 formed therein. In FIG. 6A, the plate 38 is shown with a polygonal shape.

Diamond turning can be used to form a master set of optics from which molds can be formed for use in molding the plates 38 and 58. By molding the plates 38 and 58, assembly can be simplified and manufacturing cost can be reduced since each lens 14 and optical wedge 16 will be pre-aligned. Each plate 38 and 58 can comprise glass or a transparent polymer and can be attached to the optical baffle 20 by snapping the plates 38 and 58 into place on the baffle 20, or by using an adhesive.

This second example of the laser warning receiver 10 can operate as has been previously described for the first example of the present invention.

The laser warning receiver 10 of the present invention can also be used for ground applications either by a soldier, or on a vehicle (e.g. a truck or a tank). For use by a soldier, one or more laser warning receivers 10 can be attached to the soldier's helmet. Each laser warning receiver 10 can be self contained and can provide an audible alarm when a laser threat is sensed. For use on a vehicle, a plurality of laser warning receivers 10 can be located at various points around the vehicle to cover all possible directions from which a laser threat might be received. The laser warning receivers 10 can then communicate with a console unit 28 which can be located within the vehicle. Each laser warning receiver 10 can be attached to the vehicle or to a soldier's helmet, for example, by using an adhesive applied to a bottom surface of the substrate 34.

The matter set forth in the foregoing description and accompanying drawings is offered by way of illustration only and not as a limitation. Those skilled in the art will understand from the teaching of the present invention that other types of semiconductor materials can be used in the multi-wavelength photodetector 18 of the laser warning receiver 10. As an example, mercury-cadmium-telluride can be used as the semiconductor material for one or more of the semiconductor layers 40 to detect laser light 100 in the 1-30 μm wavelength range, with the exact wavelength which the mercury-cadmium-telluride layer 40 is designed to detect being determined from the composition of the mercury-cadmium-telluride. The actual scope of the invention is intended to be defined in the following claims when viewed in their proper perspective based on the prior art.

What is claimed is:

1. A laser warning receiver comprising a plurality of optical channels, with each optical channel having optics comprising a lens, a stepped light baffle and at least one optical wedge, with the optics for each optical channel being optically oriented to receive laser light at an angle of arrival which is different for each optical channel and to direct the laser light onto a multi-wavelength photodetector located in each optical channel to generate an electrical signal wherefrom a wavelength of the laser light and the angle of arrival of the laser light can be identified, and with the angle of arrival of the laser light in each optical channel being limited to a few degrees or less by the stepped light baffle.

2. The apparatus of claim 1 wherein the lens and the optical wedge each comprise glass or a polymer.

3. The apparatus of claim 1 wherein the optics for all of the plurality of optical channels are provided as a molded plate with each lens being located on one side of the molded plate and with each optical wedge being located on the other side of the molded plate.

4. The apparatus of claim 1 wherein the light baffle is located between the optics and the multi-wavelength photodetector.

5. The apparatus of claim 1 wherein each multi-wavelength photodetector comprises a plurality of semiconductor layers which are stacked up and spaced apart within a multi-layer dielectric stack which includes a resonant cavity formed about each semiconductor layer to separate the laser light according to wavelength and to concentrate a majority of the laser light at each different wavelength into one of the semiconductor layers to identify the wavelength of the laser light.

6. The apparatus of claim 3 further comprising another molded plate comprising an additional optical wedge for each optical channel located above the molded plate containing each lens.

7. The apparatus of claim 5 further comprising a metal mirror located beneath each multi-wavelength photodetector.

8. The apparatus of claim 5 wherein each semiconductor layer comprises silicon or germanium.

9. The apparatus of claim 5 wherein the multi-layer dielectric stack comprises dielectric layers of two different materials.

10. The apparatus of claim 9 wherein the dielectric layers of the two different materials comprise a first dielectric material and a second dielectric material with the first dielectric material having an index of refraction which is different from the index of refraction of the second dielectric material.

11. The apparatus of claim 10 wherein the first dielectric material comprises silicon dioxide, and the second dielectric material comprises titanium dioxide.

12. A laser warning receiver, comprising:
- a plurality of optical channels which each receive laser light from a different angle of arrival, with each optical channel having a lens located on one side of a transparent plate and an optical wedge located on an opposite side of the transparent plate, and a stepped light baffle to limit the angle of arrival of the laser light in each optical channel to a few degrees or less; and
- a multi-wavelength photodetector located in each optical channel to detect the laser light received by that optical channel and to generate therefrom an electrical signal indicative of the angle of arrival of the laser light and a wavelength of the laser light.

13. The apparatus of claim 12 further comprising another optical wedge for each optical channel which is located on another transparent plate located proximate to the transparent plate containing each lens.

14. The apparatus of claim 12 wherein the multi-wavelength photodetector comprises a plurality of semiconductor layers which are located within a multi-layer dielectric stack which includes a resonant cavity formed about each semiconductor layer to concentrate a majority of the laser light at each different wavelength into one of the semiconductor layers based on the wavelength of the laser light.

15. The apparatus of claim 12 further comprising a substrate whereon each multi-wavelength photodetector is located, with the substrate comprising a signal processor which receives the electrical signal from each multi-wavelength photodetector to determine therefrom the angle of arrival of the laser light and the wavelength of the laser light.

16. The apparatus of claim 14 wherein the multi-layer dielectric stack is divided into a plurality of sections with one of the sections of the multi-layer dielectric stack separating each adjacent pair of the semiconductor layers, and with each section of the multi-layer dielectric stack comprising a plurality of alternating layers of two different dielectric materials each having a different index of refraction.

17. The apparatus of claim 15 further comprising an alarm operatively connected to the signal processor to signal a detection of the laser light.

18. A laser warning receiver, comprising:
- a plurality of optical channels to receive laser light, with each optical channel being optically oriented to receive the laser light from a different angle of arrival;
- a multi-wavelength photodetector located in each optical channel to generate an electrical signal from the laser light received by that optical channel, with the multi-wavelength photodetector comprising a plurality of semiconductor layers stacked up within a multi-layer dielectric stack which concentrates a majority of the laser light into one of the semiconductor layers which is determined by a wavelength of the laser light; and
- a signal processor to receive the electrical signal from each multi-wavelength photodetector and determine therefrom the angle of arrival and the wavelength of the laser light.

19. The apparatus of claim 18 wherein each optical channel includes a lens and at least one optical wedge.

20. The apparatus of claim 18 further comprising an alarm operatively connected to the signal processor to provide an audible alarm signal to signal a detection of the laser light.

21. The apparatus of claim 18 wherein the laser warning receiver further comprises a radio-frequency or microwave transmitter to transmit a warning signal to a receiver whenever the laser light is detected.

22. The apparatus of claim 18 wherein the multi-layer dielectric stack includes a resonant cavity formed about each semiconductor layer, with the resonant cavity comprising a plurality of alternating dielectric layers formed from two different dielectric materials, and with each of the two different dielectric materials having a different index of refraction.

23. The apparatus of claim 19 wherein each optical channel includes a baffle to reject light outside of the angle of arrival for that optical channel.

* * * * *